United States Patent
Sudre

(10) Patent No.: US 12,534,414 B2
(45) Date of Patent: Jan. 27, 2026

(54) SLOTS AND PRE-WEAKENED REGION IN 3D WOVEN COMPONENTS

(71) Applicant: Raytheon Technologies Corporation, Farmington, CT (US)

(72) Inventor: Olivier H. Sudre, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/213,533

(22) Filed: Jun. 23, 2023

(65) Prior Publication Data
US 2024/0425421 A1   Dec. 26, 2024

(51) Int. Cl.
| | | |
|---|---|---|
| C04B 35/80 | (2006.01) |
| C04B 35/626 | (2006.01) |
| C04B 35/628 | (2006.01) |
| D02G 3/02 | (2006.01) |
| D02G 3/44 | (2006.01) |
| D03D 13/00 | (2006.01) |
| D03D 15/242 | (2021.01) |
| D03D 15/283 | (2021.01) |
| D03D 25/00 | (2006.01) |

(52) U.S. Cl.
CPC .......... *C04B 35/80* (2013.01); *C04B 35/6267* (2013.01); *C04B 35/62863* (2013.01); *C04B 35/62884* (2013.01); *C04B 35/62892* (2013.01); *D02G 3/02* (2013.01); *D02G 3/447* (2013.01); *D03D 13/004* (2013.01); *D03D 15/242* (2021.01); *D03D 15/283* (2021.01); *D03D 25/005* (2013.01); C04B 2235/3826 (2013.01); C04B 2235/5244 (2013.01); C04B 2235/5256 (2013.01); C04B 2235/612 (2013.01); C04B 2235/614 (2013.01); C04B 2235/616 (2013.01); D10B 2101/16 (2013.01); D10B 2321/06 (2013.01); D10B 2505/02 (2013.01)

(58) Field of Classification Search
CPC ...................................................... C04B 35/80
See application file for complete search history.

(56) References Cited

U.S. PATENT DOCUMENTS

| | | | |
|---|---|---|---|
| 7,754,126 B2 | 7/2010 | Subramanian et al. | |
| 9,545,762 B2 | 1/2017 | Marlin et al. | |
| 10,384,981 B2 | 8/2019 | Hall et al. | |
| 11,174,752 B2 | 11/2021 | Dyson et al. | |
| 11,326,470 B2 | 5/2022 | Dyson et al. | |
| 2010/0151183 A1* | 6/2010 | Davis | B32B 5/26 |
| | | | 428/218 |
| 2010/0189556 A1* | 7/2010 | Propheter-Hinckley | |
| | | | F01D 5/284 |
| | | | 416/241 B |
| 2012/0275908 A1* | 11/2012 | Guo | F01D 9/04 |
| | | | 415/174.4 |
| 2016/0115086 A1* | 4/2016 | Tuertscher | C04B 35/573 |
| | | | 264/29.1 |
| 2016/0258320 A1* | 9/2016 | Thomas | F01D 25/005 |
| 2018/0148381 A1 | 5/2018 | Delehouze et al. | |
| 2023/0192562 A1 | 6/2023 | Read et al. | |

FOREIGN PATENT DOCUMENTS

| | | | | |
|---|---|---|---|---|
| EP | 2416944 A1 * | 2/2012 | ............ | B29B 11/16 |
| WO | 2020209848 A1 | 10/2020 | | |

OTHER PUBLICATIONS

Extended European Search Report for EP Application No. 24180281. 8, dated Nov. 25, 2024, 8 pages.

* cited by examiner

*Primary Examiner* — Tabatha L Penny
(74) *Attorney, Agent, or Firm* — Kinney & Lange, P.A.

(57) ABSTRACT

A method of forming a ceramic matrix composite includes forming a preform by weaving a plurality of warp tows with a plurality of weft tows, weaving a plurality of fugitive yarns into a region of the preform in at least one of a warp position or weft position, and subsequently, decomposing the fugitive yarns to transform the region into a pre-weakened region, the pre-weakened region having a higher porosity than a remainder of the preform.

10 Claims, 4 Drawing Sheets

SLOTS AND PRE-WEAKENED REGION IN 3D WOVEN COMPONENTS

BACKGROUND

The present invention relates to ceramic matrix composites (CMCs), and more particularly, to the preparation of ceramic materials for use in ceramic matrix composites.

Many CMC components require features such as slots for inserting seals and/or variously sized cavities. Such features can be produced at different stages of the process but are typically formed by machining techniques, such as grinding or drilling. The speed of machining is in large part a function of the density/porosity of the area to be machined. Thus, means for locally increasing porosity of a CMC component can facilitate subsequent machining operations.

SUMMARY

A method of forming a ceramic matrix composite includes forming a preform by weaving a plurality of warp tows with a plurality of weft tows, weaving a plurality of fugitive yarns into a region of the preform in at least one of a warp position or weft position, and subsequently, decomposing the fugitive yarns to transform the region into a pre-weakened region, the pre-weakened region having a higher porosity than a remainder of the preform.

A ceramic preform includes a woven architecture having a plurality of warp tows, a plurality of weft tows, and a plurality of fugitive yarns within a region of the preform in at least one of a warp position or weft position.

Figure 1:
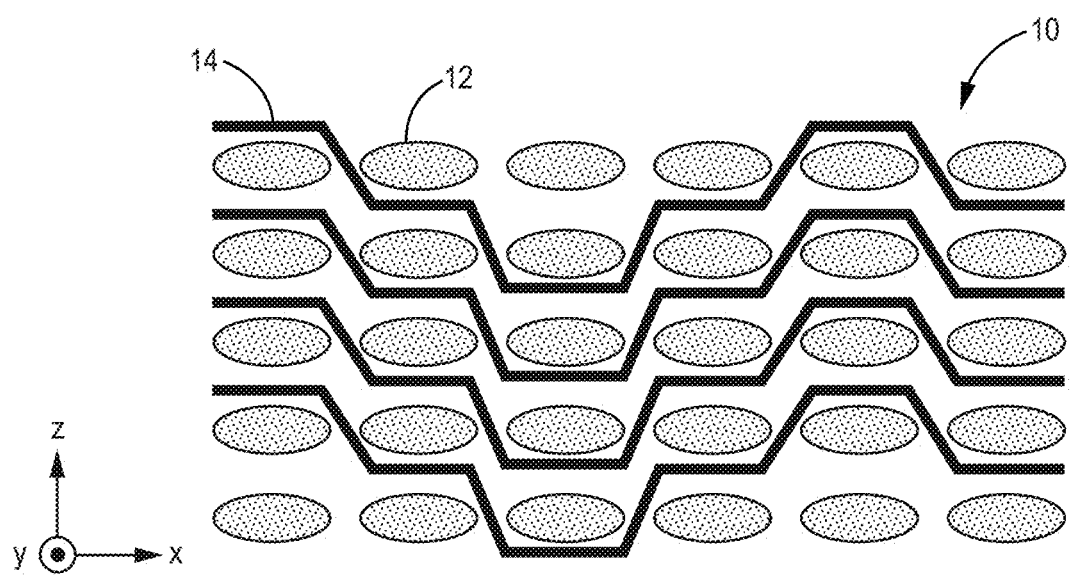
FIG. 1 is a simplified cross-sectional illustration of a fibrous ceramic preform.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents the localized introduction of a fugitive material into a woven ceramic structure. The fugitive material is eliminated during processing of the ceramic preform, creating a lower localized porosity in the resulting CMC. Machining of these lower porosity regions to form cavities can be less time consuming than with uniformly porous CMCs.

FIG. 1 is a simplified cross-sectional illustration of preform 10. Preform 10 can be three-dimensionally woven from weft tows 12 and warp tows 14 in various architectures including multilayer, angle interlock, and orthogonal. Depending on the woven architecture, a subset of warp tows 14 may be stuffer warp tows and another subset can be binding warp tows which cross and weave together multiple layers (i.e., extending in both the x and z-directions). Tows 12 and 14 can be formed from bundled ceramic (e.g., silicon carbide) fibers. In an alternative embodiment, preform 10 can be formed from variously arranged two-dimensionally woven fabrics.

Figure 2:
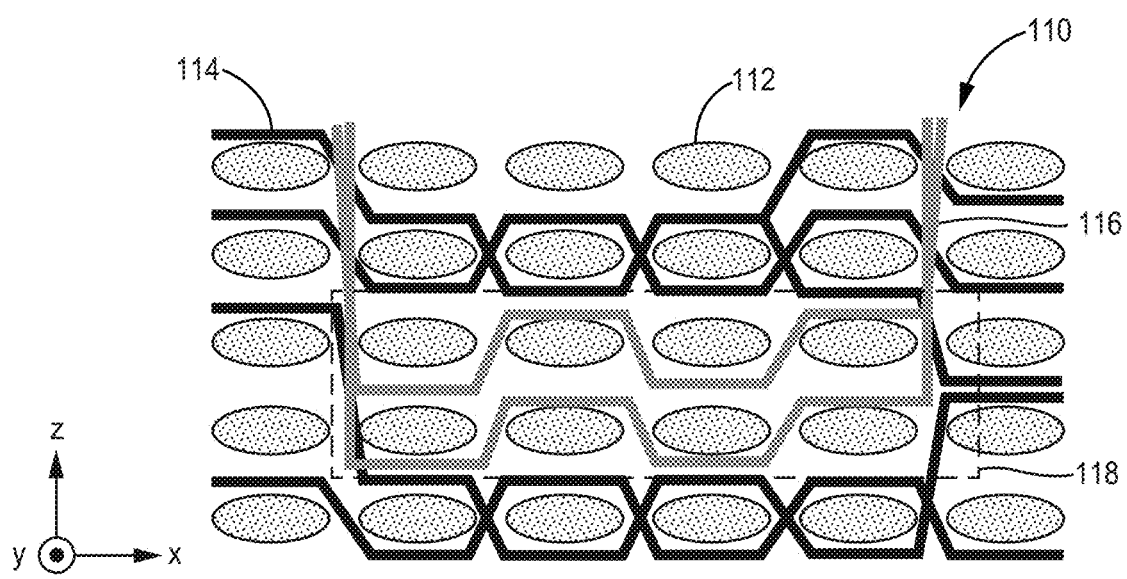
FIG. 2 is a simplified cross-sectional illustration of a fibrous ceramic preform with fugitive yarns.

FIG. 2 is a simplified cross-sectional illustration of preform 110, which is substantially similar to preform 10, being three-dimensionally woven from weft tows 112 and warp tows 114. Preform 110 differs in that the woven architecture further includes fugitive yarns 116 in region 118. There may be multiple such regions 118 in a given preform 110. Fugitive yarns 116 are shown in a warp position, but can alternatively be introduced in a weft position. Fugitive yarns 116 can be formed from a polymer material, such as polyvinyl alcohol (PVA). Other polymers are contemplated herein. Rather than omitting some warp tows 114 to accommodate fugitive yarns 116, the woven architecture can be slightly locally modified such that some warp tows 114 can be rerouted through preform 110, deviating slightly from the underlying woven architecture. Depending on how the warp tows 114 are rerouted (e.g., along the borders of region 118), this can create reinforced areas on the periphery of region 118.

Figure 3:
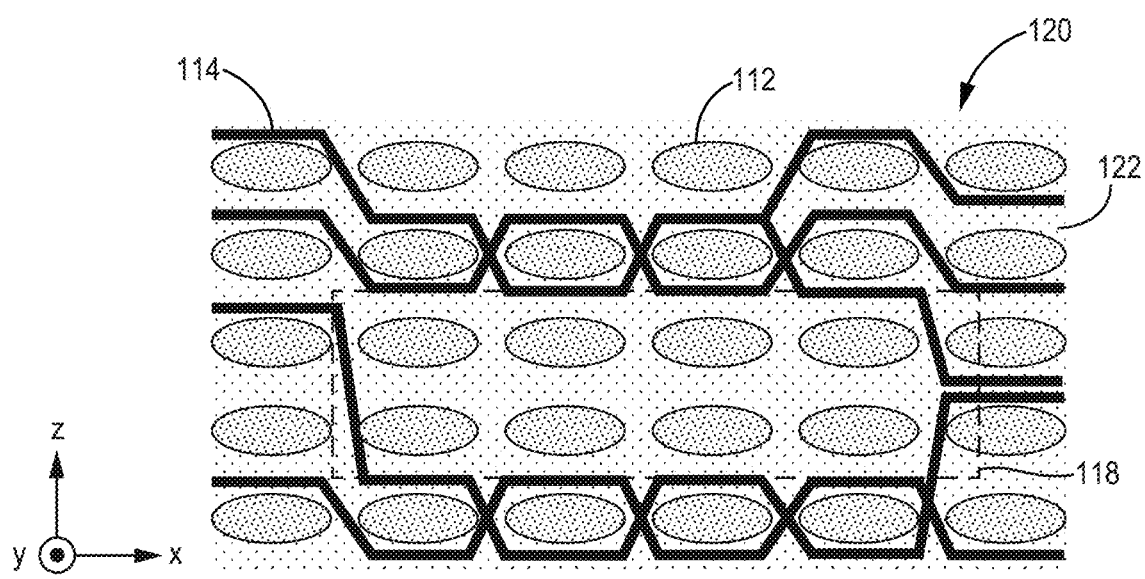
FIG. 3 is a simplified cross-sectional illustration of a CMC formed from the fibrous ceramic preform of FIG. 2.

FIG. 3 is a simplified cross-sectional illustration of preform CMC 120, formed by densifying preform 110 of FIG. 2 with ceramic (e.g., SiC) matrix 122. Densification is carried via chemical vapor infiltration (CVI) out until the resulting CMC has reached the desired residual porosity. Interface coating(s) (e.g., of boron nitride) can be deposited, also via CVI, prior to the matrix to ensure that the composite fails in a non-brittle manner. In an alternative embodiment, densification can additionally and/or alternatively include other methodologies such as, but not limited to, melt infiltration (MI) and polymer infiltration and pyrolysis (PIP). Fugitive yarns 116 can be thermally and/or chemically decomposed prior to, or during densification. Accordingly, region 118 becomes a "pre-weakened" region in CMC 120 because the locally reduced fiber (i.e., tow) volume fraction leads to a higher final porosity in pre-weakened region 118. Rather than simply omitting select warp tows 114 and/or weft tows 112 to create pre-weakened region 118, fugitive yarns 116 act to maintain/hold together the woven architecture of preform 110 through the preforming process and prior to their decomposition, which prevents defects and deformation of the weave from forming in the resulting region surrounding the cavity of CMC 120.

Figure 4:
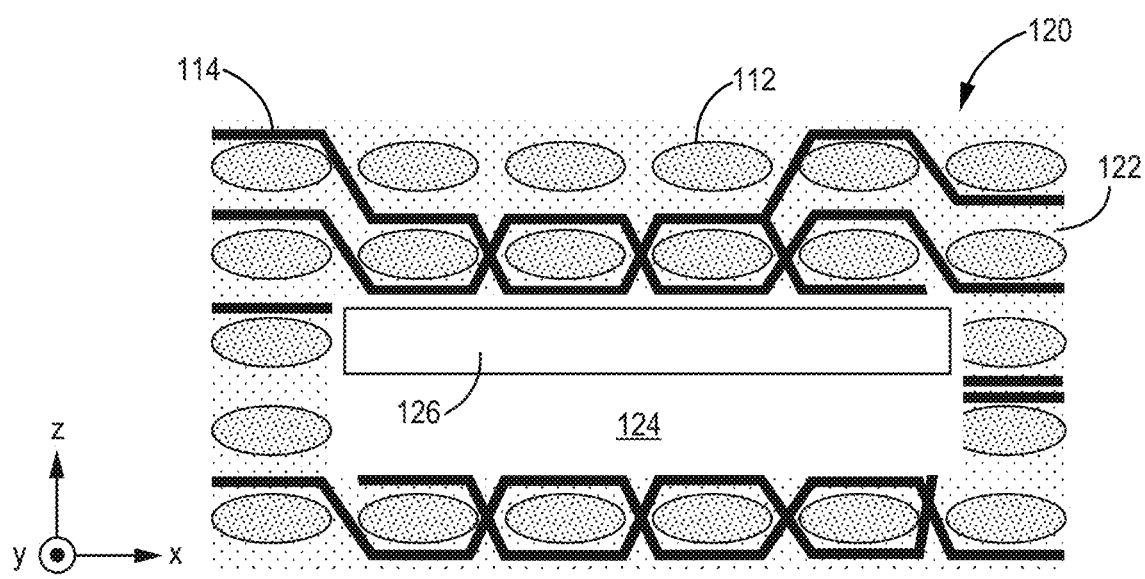
FIG. 4 is a simplified cross-sectional illustration of the CMC of FIG. 3 after machining operations.

FIG. 4 is a simplified cross-sectional illustration of preform CMC 120 after machining operations to form slot 124. Slot 124 is generally coextensive with pre-weakened region 118 (FIG. 3). Accordingly, machining can take relatively less time than would an adjacent region due to the locally higher porosity of pre-weakened region 118. In one example, CMC 120 can be a blade outer airseal (BOAS) of a gas turbine engine, and slot 124 can be formed to receive sealing element 126, which can be a feather seal in one example. Other materials (e.g., metal or ceramic) for forming a joint or seal can also be inserted into slot 124. Other CMC components requiring slots, cavities, etc. are contemplated herein.

A CMC component formed with the disclosed pre-weakened regions can be incorporated into aerospace, maritime, or industrial equipment, to name a few, non-limiting examples.

Discussion of Possible Embodiments

The following are non-exclusive descriptions of possible embodiments of the present invention.

A method of forming a ceramic matrix composite includes forming a preform by weaving a plurality of warp tows with a plurality of weft tows, weaving a plurality of fugitive yarns into a region of the preform in at least one of a warp position or weft position, and subsequently, decomposing the fugitive yarns to transform the region into a pre-weakened region, the pre-weakened region having a higher porosity than a remainder of the preform.

The method of the preceding paragraph can optionally include, additionally and/or alternatively, any one or more of the following features, configurations and/or additional steps:

The above method can further include densifying the preform with a ceramic matrix using one of: chemical vapor infiltration, polymer infiltration and pyrolysis, and slurry infiltration.

In any of the above methods, the plurality of fugitive yarns can be decomposed during or prior to densifying the preform.

In any of the above methods, the plurality of fugitive yarns can be formed from polyvinyl alcohol.

In any of the above methods, the matrix can include silicon carbide.

Any of the above methods can further include machining the pre-weakened region to form a slot in the ceramic matrix composite.

In any of the above methods, the step of machining the pre-weakened region can include at least one of drilling and grinding.

Any of the above methods can further include inserting a sealing element into the slot.

In any of the above methods, weaving the plurality of warp tows, the plurality of weft tows, and the plurality of fugitive yarns can include a three-dimensional weaving technique.

Any of the above methods can further include redirecting a subset of the warp tows through the preform to accommodate the plurality of fugitive yarns.

In any of the above methods, the step of decomposing the fugitive yarns can include at least one of a thermal and a chemical decomposition process.

In any of the above methods, the plurality of warp tows and the plurality of weft tows can be three-dimensionally woven.

In any of the above methods, the ceramic matrix composite can be a component for a gas turbine engine.

A ceramic preform includes a woven architecture having a plurality of warp tows, a plurality of weft tows, and a plurality of fugitive yarns within a region of the preform in at least one of a warp position or weft position.

The method of the preceding paragraph can optionally include, additionally and/or alternatively, any one or more of the following features, configurations and/or additional components:

In the above preform, each of the plurality of warp tows and the plurality of weft tows can be formed form silicon carbide.

In any of the above preforms, each of the plurality of fugitive yards can be formed from a polymer material.

In any of the above preforms, the polymer material can be polyvinyl alcohol.

In any of the above preforms, the woven architecture can be a three-dimensional woven architecture.

In any of the above preforms, the three-dimensional woven architecture can be one of a multilayer, angle interlock, and orthogonal architecture.

In any of the above preforms, a porosity of the region can be higher than in a remainder of the preform.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a ceramic matrix composite, the method comprising:
   forming a preform by:
      weaving a plurality of warp tows with a plurality of weft tows, wherein weaving the plurality of warp tows comprises redirecting a subset of the plurality of warp tows around a region of the preform such that the region is free of the plurality of warp tows;
      weaving a plurality of fugitive yarns into the region of the preform in at least one of a warp position or weft position, wherein weaving the plurality of warp tows, the plurality of weft tows, and the plurality of fugitive yarns comprises a three-dimensional weaving technique and wherein redirecting the subset of the plurality of warp tows comprises routing the subset of the plurality of warp tows along a border of the region to provide a reinforced area along a periphery of the region;
   subsequently, decomposing the fugitive yarns to transform the region into a pre-weakened region, the pre-weakened region having a higher porosity than a remainder of the preform;
   densifying the preform with a ceramic matrix; and
   machining the pre-weakened region to form a slot in the ceramic matrix composite.

2. The method of claim 1, wherein densifying the preform with a ceramic matrix is conducted using one of: chemical vapor infiltration, polymer infiltration and pyrolysis, and slurry infiltration.

3. The method of claim 2, wherein the plurality of fugitive yarns is decomposed during or prior to densifying the preform.

4. The method of claim 1, wherein the plurality of fugitive yarns is formed from polyvinyl alcohol.

5. The method of claim 1, wherein the matrix comprises silicon carbide.

6. The method of claim 1, wherein the step of machining the pre-weakened region comprises at least one of drilling and grinding.

7. The method of claim 1, and further comprising: inserting a sealing element into the slot.

8. The method of claim 1, wherein the step of decomposing the fugitive yarns comprises at least one of a thermal and a chemical decomposition process.

9. The method of claim 1, wherein the ceramic matrix composite is a component for a gas turbine engine.

10. The method of claim 1, wherein the region comprises a subset of the plurality of the weft tows.

* * * * *